US010380083B2

(12) United States Patent
Greenstein et al.

(10) Patent No.: US 10,380,083 B2
(45) Date of Patent: *Aug. 13, 2019

(54) ENABLING COLLABORATIVE DEVELOPMENT OF A DATABASE APPLICATION ACROSS MULTIPLE DATABASE MANAGEMENT SYSTEMS

(71) Applicant: International Business Machines Corporation, Armonk, NY (US)

(72) Inventors: Marina A. Greenstein, Croton-on-Hudson, NY (US); Galina Grunin, Briarcliff Manor, NY (US); Maria N. Schwenger, Henderson, NV (US); Pandikumar Swamikrishnan, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,211

(22) Filed: Dec. 11, 2017

(65) Prior Publication Data

US 2018/0107690 A1    Apr. 19, 2018

Related U.S. Application Data

(63) Continuation of application No. 15/231,835, filed on Aug. 9, 2016, now Pat. No. 9,916,333, which is a (Continued)

(51) Int. Cl.
*G06F 17/30* (2006.01)
*G06F 16/21* (2019.01)
(Continued)

(52) U.S. Cl.
CPC .......... *G06F 16/211* (2019.01); *G06F 16/252* (2019.01); *G06F 16/27* (2019.01); *G06F 16/275* (2019.01); *G06F 8/30* (2013.01)

(58) Field of Classification Search
None
See application file for complete search history.

(56) References Cited

U.S. PATENT DOCUMENTS 7,469,248 B2    12/2008  Agrawal et al.
7,469,284 B1 *  12/2008  Dubrovsky ........... H04L 41/042
                                                    709/201

(Continued)

OTHER PUBLICATIONS

Debbie M. Le, USPTO Notice of Allowance and Fee(s) Due, U.S. Appl. No. 14/156,106, dated Jun. 7, 2016, 20 pages.

(Continued)

*Primary Examiner* — Debbie M Le
(74) *Attorney, Agent, or Firm* — Daniel R. Simek; Maxine L. Barasch; Keohane & D'Alessandro PLLC

(57) ABSTRACT

An approach for enabling collaborative development of a database application is provided. Specifically, this approach provides a database development and collaboration tool (DDCT), which can be utilized by multiple developers involved in a particular software project, to enable automated synchronization and database version control by allowing a database development language and data changes to be stored in a metadata form that is general to more than one database management system (DBMS). Each developer is united and able to collaborate through the system, thus ensuring that a change to a database structure and/or data in a static data table created in a particular database language by one developer is automatically incorporated in the overall development process. Furthermore, the DDCT provides the opportunity to maintain a single repository entry for more than one DBMS, which simplifies synchronization.

20 Claims, 4 Drawing Sheets

Related U.S. Application Data continuation of application No. 14/156,106, filed on Jan. 15, 2014, now Pat. No. 9,442,996.

(51) Int. Cl.
*G06F 16/27* (2019.01)
*G06F 16/25* (2019.01)
*G06F 8/30* (2018.01)

(56) References Cited

U.S. PATENT DOCUMENTS

| | | | |
|---|---|---|---|
| 8,150,886 B2 | 4/2012 | Rhodes et al. | |
| 8,745,076 B2* | 6/2014 | Pazdziora | G06F 17/30389 707/759 |
| 8,880,464 B1* | 11/2014 | Haeske | G06F 17/30575 707/615 |
| 9,031,909 B2* | 5/2015 | Iyer | G06F 17/30011 707/638 |
| 9,442,996 B2 | 9/2016 | Greenstein et al. | |
| 9,507,810 B2* | 11/2016 | Baeuerle | H04L 67/141 |
| 9,535,948 B1* | 1/2017 | Cuthbert | G06F 17/30427 |
| 9,740,713 B1* | 8/2017 | Greenwood | G06F 17/30297 |
| 2008/0189678 A1 | 8/2008 | Joo et al. | |
| 2008/0319813 A1 | 12/2008 | du Preez et al. | |
| 2009/0271384 A1 | 10/2009 | Bakalash et al. | |
| 2012/0030172 A1 | 2/2012 | Pareek et al. | |
| 2012/0233555 A1 | 9/2012 | Psistakis et al. | |
| 2013/0138612 A1 | 5/2013 | Iyer | |
| 2014/0372466 A1 | 12/2014 | Wong | |
| 2015/0199395 A1 | 7/2015 | Greenstein et al. | |
| 2016/0350338 A1 | 12/2016 | Greenstein et al. | |

OTHER PUBLICATIONS

Debbie M. Le, USPTO Office Action, U.S. Appl. No. 15/231,835, dated May 19, 2017, 16 pages.

Debbie M. Le, USPTO Notice of Allowance and Fee(s) Due, U.S. Appl. No. 15/231,835, dated Oct. 27, 2017, 10 pages.

* cited by examiner

ENABLING COLLABORATIVE DEVELOPMENT OF A DATABASE APPLICATION ACROSS MULTIPLE DATABASE MANAGEMENT SYSTEMS

RELATED U.S. APPLICATION DATA

The present patent document is a continuation of, and claims the benefit of, co pending and co-owned U.S. patent application Ser. No. 15/231,835, filed Aug. 9, 2016, which is a continuation of commonly owned U.S. patent application Ser. No. 14/156,106, filed Jan. 15, 2014, issued Sep. 13, 2016 as U.S. Pat. No. 9,442,996, the entire contents of which is incorporated herein by reference.

FIELD OF THE INVENTION

The present invention generally relates to collaborative software application development. Specifically, the present invention relates to collaborative development of a database application by multiple developers across diverse database management systems.

BACKGROUND OF THE INVENTION

Software development is oftentimes performed by a group or team of developers. Typically, a software project is developed through design efforts, test efforts, implementation efforts and maintenance efforts. There may be different groups and different group members participating in each of these efforts. Various modeling and other development tools are used for increased communication and consistency during development of software projects.

One such tool is a database version control system, which incorporates changes to a database. However, existing database version control systems are specific to a particular database management system (DBMS), and provide for synchronization of database scripts or metadata only, meaning each developer has to manually process those scripts to sync the database. For example, one copy of the database code will be stored, maintained, backed-up, and updated for every different DBMS. When changes to the database are to be incorporated, the developer who performed the changes submits scripts or metadata changes to be available to other developers for synchronizing their local databases. These synchronization/replication methods are specific to each DBMS vendor and are performed based on the syntax and other requirements specific to the particular DBMS. Unfortunately, this requires a complex mechanism for multi-level support, synchronization, and maintenance of the database entries for each specific project.

SUMMARY OF THE INVENTION

An approach for enabling collaborative development of a database application across multiple, diverse database management systems is provided. Specifically, this approach provides a database development and collaboration tool (DDCT), which can be utilized by multiple developers involved in a particular software project, to enable automated synchronization and database version control by allowing a database development language and data changes to be stored in a metadata form that is general to more than one database management system (DBMS). Each developer is united and able to collaborate through the system, thus ensuring that a change to a database structure and/or data in a static data table created in a particular database language by one developer is automatically incorporated in the overall development process. Furthermore, the DDCT provides the opportunity to maintain a single repository entry for more than one DBMS, which simplifies synchronization.

In one embodiment, there is a method for enabling collaborative development of a database application, the method comprising: receiving a database generated via a first database management system (DBMS); designating a set of tables from the database as a set of static data tables; committing the database and the set of static data tables to a repository; deploying, from the repository, the database in a second DBMS; receiving a change to the database via at least one of: the first DBMS, and the second DBMS, wherein the change is represented as metadata that is general to both the first DBMS and the second DBMS; and synchronizing the change to the database within the repository based on the metadata.

In another embodiment, there is a system for enabling collaborative development of a database application across multiple database management systems: at least one processing unit; memory operably associated with the at least one processing unit; and a database development collaboration tool (DDCT) storable in memory and executable by the at least one processing unit, the DDCT comprising: a development module configured to: receive a database generated via a first database management system (DBMS); designate a set of tables from the database as a set of static data tables; commit the database and the set of static data tables to a repository; and deploy, from the repository, the database in a second DBMS; and a synchronization module configured to: receive a change to the database via at least one of: the first DBMS, and the second DBMS, wherein the change is represented as metadata that is general to both the first DBMS and the second DBMS; and synchronize the change to the database within the repository based on the metadata.

In another embodiment, there is a device storing computer instructions, which when executed, enables a computer system to provide collaborative development of a database application across multiple database management systems, the computer instructions comprising: receiving a database generated via a first database management system (DBMS); designating a set of tables from the database as a set of static data tables; committing the database and the set of static data tables to a repository; deploying, from the repository, the database in a second DBMS; receiving a change to the database via at least one of: the first DBMS, and the second DBMS, wherein the change is represented as metadata that is general to both the first DBMS and the second DBMS; and synchronizing the change to the database within the repository based on the metadata.

Figure 1:
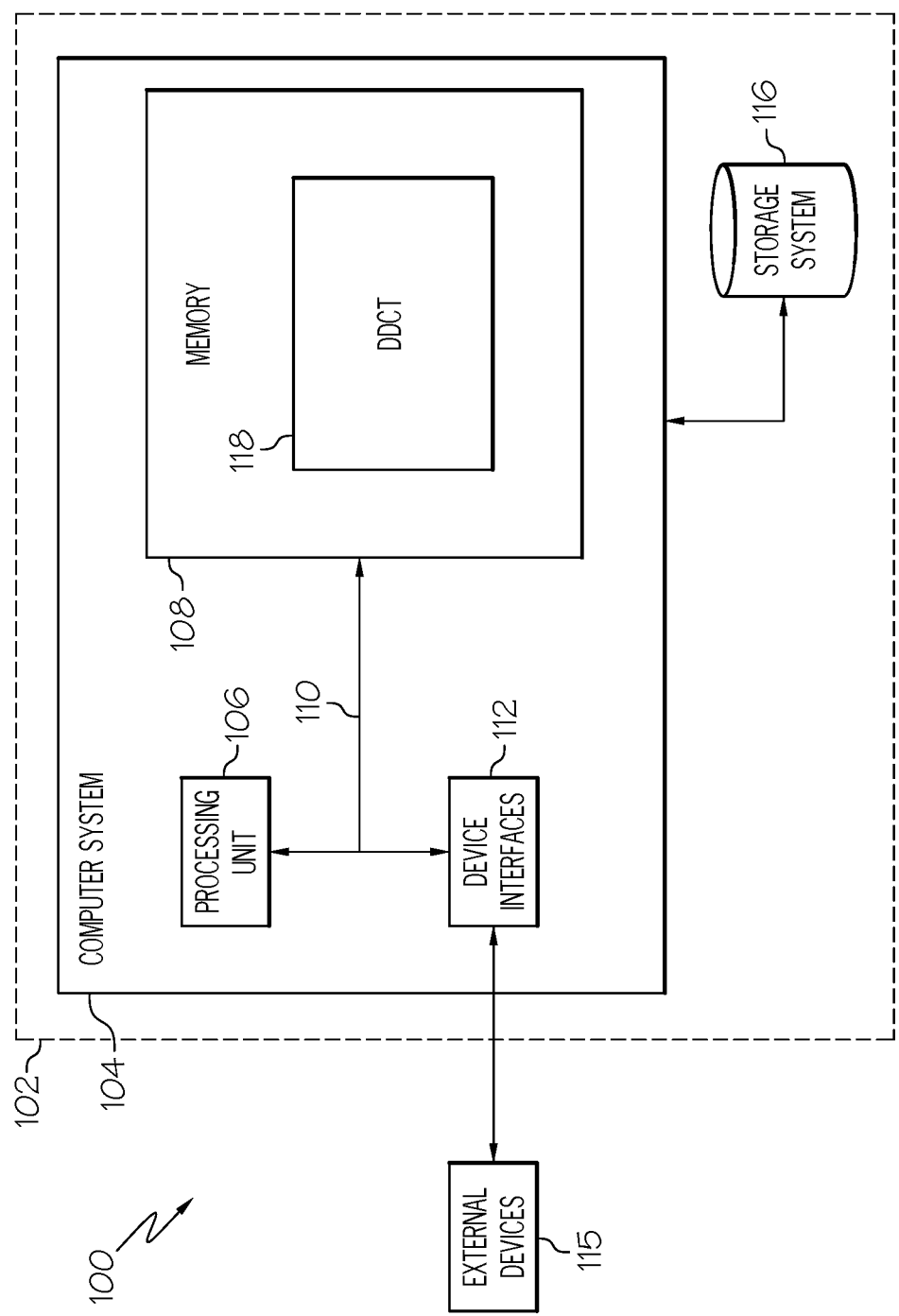
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments now will be described more fully herein with reference to the accompanying drawings, in which exemplary embodiments are shown. This disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "computing," "calculating," "evaluating," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

The word "exemplary" is used herein to mean serving as an example, instance, or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

As noted above, described herein are approaches for enabling collaborative development of a database application across multiple, diverse database management systems. Specifically, an approach provides a database development and collaboration tool (DDCT), which can be utilized by multiple developers involved in a particular software project, to enable automated synchronization and database version control by allowing a database development language and data changes to be stored in a metadata form that is general to more than one database management system (DBMS). Each developer is united and able to collaborate through the system, thus ensuring that a change to a database structure and/or data in a static data table created in a particular database language by one developer is automatically incorporated in the overall development process. Furthermore, the DDCT provides the opportunity to maintain a single repository entry for more than one DBMS, which simplifies synchronization.

Turning now to FIG. 1, a computerized implementation 100 of the present invention will be described in greater detail. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for managing change-set delivery. It should be understood that any other computers implemented under the present invention may have different components/software, but will perform similar functions. As shown, computer system 104 includes a processing unit 106 capable of receiving changes and delivering them to memory 108. Also, shown is memory 108 for storing a database development collaboration tool (DDCT) 118, a bus 110, and device interfaces 112.

Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes signals representing outputs from external devices 118 (e.g., a graphical user interface operated by an end-user) to DDCT 118. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption. Different sensor systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating DDCT 118, which is stored in memory 108 and/or storage system 116. While executing computer program code, processing unit 106 can read and/or write data to/from memory 108 and storage system 116. Storage system 116 can include VCRs, DVRs, RAID arrays, USB hard drives, optical disk recorders, flash storage devices, and/or any other data processing and storage elements for storing and/or processing data. Although not shown, computer system 104 could also include I/O interfaces that communicate with one or more external devices 118 that enable a user to interact with computer system 104 (e.g., a keyboard, a pointing device, a display, etc.), e.g., to submit changes to a database.

Figure 2:
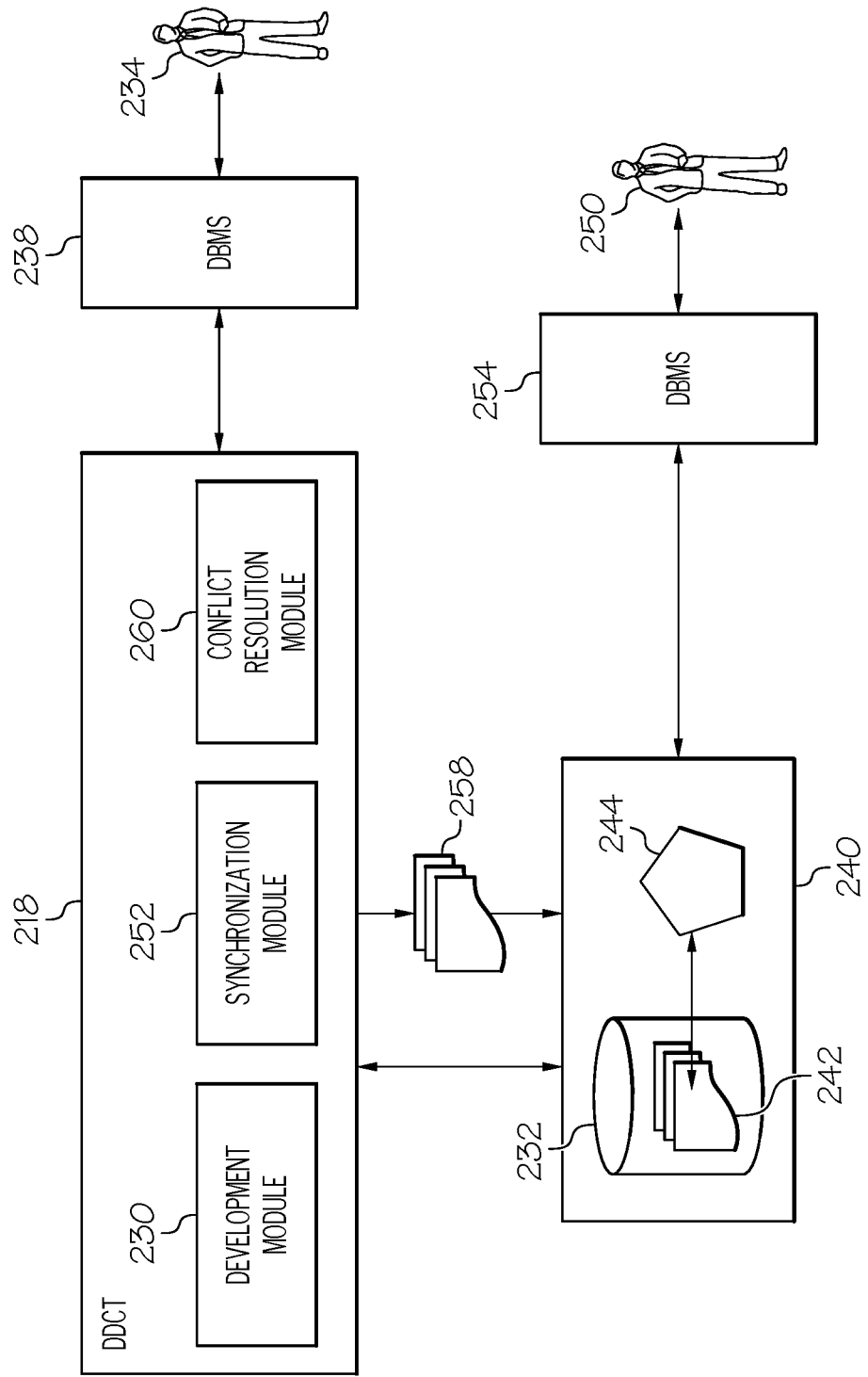
FIG. 2 shows a database development collaboration tool that operates in the environment shown in FIG. 1.

Turning now to FIG. 2, operation of DDCT 218, which provides database development collaboration, will be described in greater detail. In exemplary embodiments, DDCT 218 enables automated synchronization and version control by storing all data definition language (DDL) and data changes in a metadata form that is database management system agnostic and can be utilized by multiple users (e.g., developers) involved in a particular project. As shown, DDCT 218 comprises a development module 230 configured to receive a database 232 generated by a first user 234 via a first database management system (DBMS) 238, and commit database 232 to a repository 240. First DBMS 238 may include functions for inserting data in database 232, updating data in database 232, and/or deleting data from database 232. Exemplary database management systems include Oracle® Database, IBM DB2®, Microsoft SQL Server®, and MySQL™' (Oracle is a trademark of the Oracle Corporation having an address at 500 Oracle Parkway, Redwood City, Calif. 94065, DB2 is a trademark of International Business Machines Corporation having an address at 1 New Orchard Road, Armonk, N.Y. 10504, Microsoft SQL Server is a trademark of the Microsoft Corporation having an address at One Microsoft Way, Redmond, Wash. 98052, and MySQL is a trademark of the Oracle Corporation.)

Structured English Query Language (SQL) defines a standard language that many databases recognize. SQL, for example, includes commands such as, INSERT, UPDATE, and DELETE for manipulating data in a database. First DBMS 238 may allow first user 234 to cause additional commands to be executed prior to the operation of an SQL command. For example, first DBMS 238 may allow triggers to be added to the SQL commands so that when a command is called, other code is triggered for execution prior to the performance of the called SQL command. In addition, first DBMS 238 may be capable of storing sequences that store a value that is used in an ordered manner in database 232. For example, database 232 may store a sequence that is representative of a serial number. Each time a serial number is obtained from the sequence, the value of the sequence is incremented.

During implementation, first user 234 creates database 232 in a first database development language (e.g., via a programming user interface) or, alternatively, inserts some data into an existing database. The source code of database 232 is then committed, i.e., submitted to repository 240 such that when other users do an UPDATE or a checkout from repository 240, they will receive the latest committed version of database 232, unless they specify they wish to retrieve a previous version of the source code in repository 240.

First DBMS 238 supports a database schema for use with DDTC 218, the schema definition consisting of one or more data structures that are typically stored on some form of non-volatile media and installed in one or more namespaces. The schema contains a definition of all classes, their properties, and associations. In one non-limiting example, the database schema covers the following categories: an application system (e.g., SQL server settings, services, and logs); database objects (e.g., components/structure of the database system such as databases, tables, keys, and columns); security (e.g., users, roles, authentication login records, and permission settings for the user and role); physical storage (e.g., the physical files and file groups that are used to store the data); and bulk data operations (e.g., backup, restore, and bulk copy of data). As will be further described below, DDTC 218 enables synchronization of schema that is database-agnostic, i.e., capable of functioning with any vendor's database management system.

Development module 230 is further configured to allow first user 234 to designate a set of static data tables 242, which are also committed to the repository 240. During the commit process, first user 234 marks one or more tables from database 232 as static data tables (also referred to herein as "dictionary tables"). Static data tables refer to one or more database tables that map term identifiers to term definitions, which define application states, e.g., initial state. Data in these tables is pre-populated before application deployment and is shared and synchronized between developers during application development. During an application's life-cycle, a restricted group of users (e.g., application administrators, database administrators) are allowed to update the contents of these tables. A non-limiting list of exemplary static data tables includes application roles, geographical locations, categories, etc.

In an exemplary embodiment, structural information and data from set of static data tables 242 are defined by first user 234 as metadata 244 that is general to more than one DBMS and more than one operation system (OS). Due to the use of static data tables 242, only a single copy of the database scripts is stored in repository 240, and database 232 may be deployed in multiple DBMS because it is not particular to any specific DBMS.

When a subsequent developer (e.g., second user 250) checks out database 232 from repository 240, it is deployed, and static data tables 242 are populated with data. To accomplish this, DDCT 218 comprises a synchronization module 252 configured to deploy, from repository 240, database 232 in a second DBMS 254, and receive a change to database 232 (e.g., add, alter, or delete table, create trigger, alter view, and/or insert/update/delete data) from first user 234 or second user 250 via a user interface or API. In one embodiment, the change is received from second user 250 via second DBMS 254 and written in a database language corresponding to second DBMS 254, wherein second DBMS 254 has a different DB type than first DBMS 238. In exemplary embodiments, this change includes a change to a database structure and/or a change to the data from set of static data tables 242. In the case of a database structural change, all changes are kept intact regardless of what database language they are written. Synchronization module allows a single repository entry for both first DBMS 238 and second DBMS 254, and greatly simplifies the process of keeping these database specific implementations in-synch without requiring specific RDBMS knowledge, which eliminates the work needed to implement each change manually to the corresponding RDBMS repository entries. As such, second user 250 operating with second DBMS 254 (e.g., Oracle®) is not required to have specific knowledge of first DBMS 238 (e.g., MySQL®) in order to propagate his/her change(s). The change(s) to database 232 may be generated by second user 250 in any database language, and automatically synched in repository 240 regardless of the particular database language used by first user 234 to create database 232.

In one embodiment, synchronization module 252 is configured to generate a set of new tables 258 in response to the change to the database structure from second user 250, and add the new tables 258 to set of static data tables 242. Here, second user 250 is prompted to mark new tables 258 as static/dictionary tables.

Once the change(s) is made to database 232, it is synchronized with the version of database 232 initially committed to repository 240 based on metadata 244. Synchronization, as the term is used herein, refers to the sending and/or receiving of one or more version updates between a master copy of database 232 and one or more user copies of database 232 to create a common version of database 232. For example, each user periodically may send to the master copy a version update representing a latest version of database 232 and periodically may receive from the master copy a version update representing a current version of the master copy (e.g., which may reflect edits performed by other users). In an exemplary embodiment, synchronization module 252 is configured to receive a change to the schema of database 232 or data in static data tables 242 and automatically synchronize after one or more changes are complete. Any change to the database structure or data in static data tables 242 is then committed to repository 240. Instead of working in silos, each user will be united and collaborate through DDCT 218, thus ensuring that any change performed by one user is automatically incorporated into the overall development process. Unlike traditional approaches, embodiments of the invention provide the ability to replicate only a subset of the database schema and data, which as been updated since the last replication.

Furthermore, synchronization module 252 provides the ability to define check-in and check-out operations relative to the schema and/or content of database 232. In one embodiment, synchronization module 252 is configured to report the change(s) to database 232 (e.g., a simple log utility on metadata 244) by listing changes applied by each user, when a subsequent user "checks-in" a final version of database 232.

Due to the collaborative nature of the development environment provided herein, conflict resolution is beneficial for resolving concurrent and/or conflicting changes to database 232. In one embodiment, DDCT 218 comprises a conflict resolution module 260 configured to enable a user (e.g., an administrator, first user 234, and/or second user 250) to resolve editing conflicts arising when synchronizing changes to database 232. In general, editing conflicts may arise when the master copy of the database changes (e.g., editing operations are performed on the master copy) between when a user copy is obtained and the user copy is synchronized with the master copy, or between synchronizations. Such changes to the master copy will be referred to herein as "intervening changes."

An editing operation performed on a user copy of the database results in an editing conflict, e.g., when the editing operation interferes with an intervening change made to the master copy (i.e., or vice versa). For example, if a user performs an editing operation in a user copy of a data file to revise a first data unit that was deleted in a master copy of the data file by an intervening change, then the editing operation resulting in the revision of the first data unit would conflict with the editing operation resulting in the deletion of the first data unit in the master copy.

Updates to the database include content updates and/or metadata updates. As the term is used herein, content updates refer to any editing operation made to the substantive content of the database. For example, content updates for a word processing document can include added paragraphs (i.e., or sections thereof), deleted paragraphs (i.e., or section thereof), revised paragraphs (i.e., or sections thereof), and additions, deletions, and/or changes to tables, charts, images, or other such objects. In another embodiment, content updates for a presentation document can include added, deleted, and/or revised pictures, text, animations, sounds, and other such data objects.

Metadata edits/updates refer to changes made to metadata of the database. Non-limiting examples of metadata include content locks, presence information, and other such data. Presence information indicates which users have indicated an intention to edit an aspect of the database. Content locks inhibit editing of any content within the lock by users that do not own the lock. For example, content locks may inhibit editing conflicts by indicating which portions of the database have been claimed by another user. In some embodiments, the content locks can prevent a user from editing a portion of the database that has been claimed by another user. In other embodiments, however, the user can choose to break the content lock and edit the portion of the database. In such cases, the authoring application can warn the user that conflicts may arise when editing the locked portion.

Figure 3:
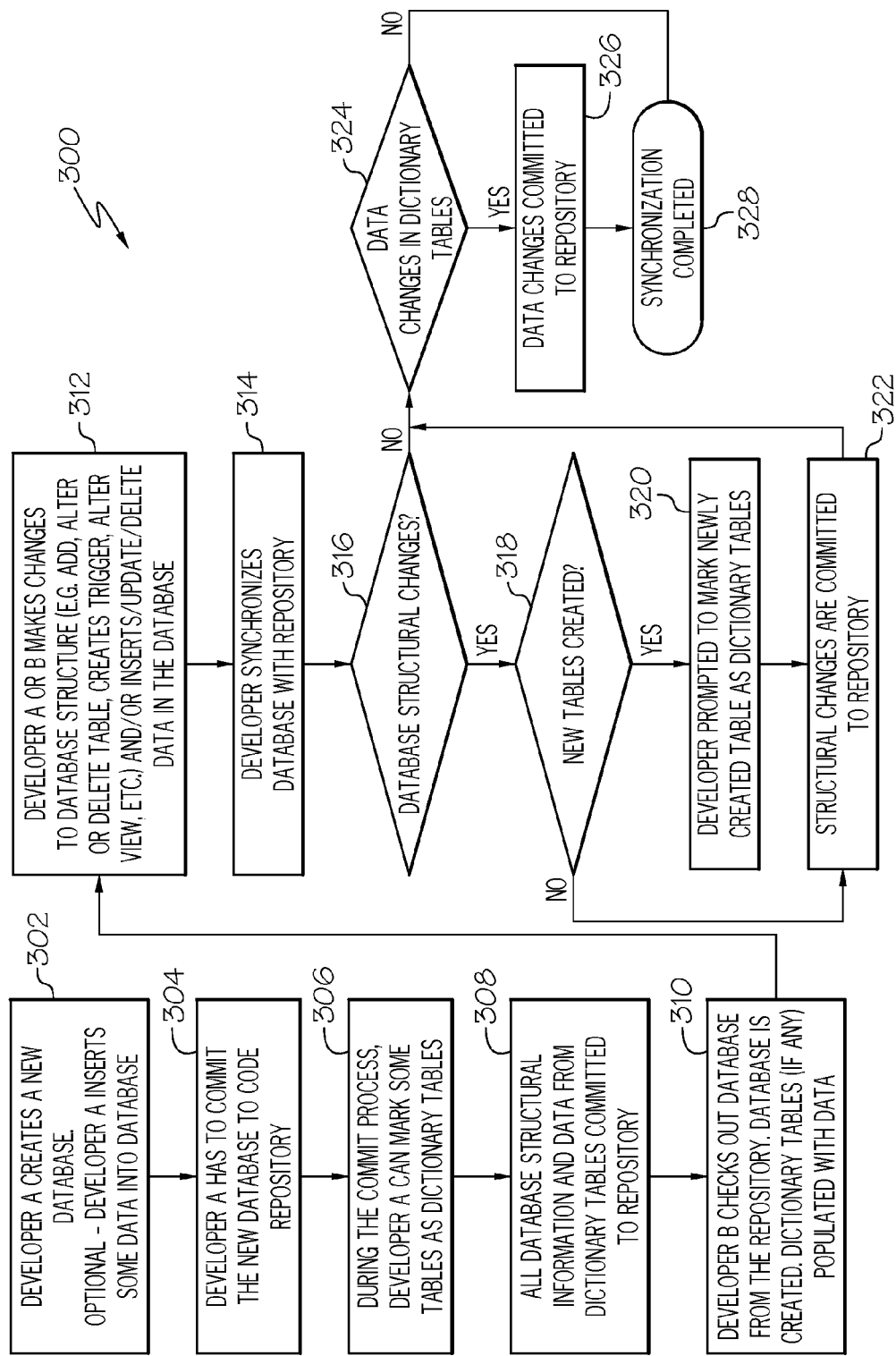
FIG. 3 shows a flow diagram of an approach for enabling collaborative development of a database application across multiple database management systems.

Turning now to FIG. 3, a flow diagram of a process 300 for enabling collaborative development of a database application across multiple database management systems is shown. Process 300 begins, and at step 302 developer A (e.g., first user 234) creates a new database or, optionally, inserts some data into an existing database. At 304, Developer A commits the new database to a code repository, and marks one or more tables as dictionary tables during the commit process (306). At 308, all database structural information (e.g., database schema) and data from dictionary tables are committed to the repository. At 310, Developer B (e.g., second user 250) checks out the database from the repository. The database is created, and the dictionary tables are populated with data. Next, at 312, developer A or B makes changes to the database structure (e.g., add, alter, or delete tables, create trigger, alter view, etc.) and/or inserts/updates/deletes data in the database. The database is then synchronized with the repository at 314, and at 316 it is determined if any structural changes have been made to the database structure. If yes, at 318 one or more new tables are created, and the developer is prompted to mark the newly created table(s) as a dictionary table (320). The structural changes are then committed to the repository at 322. Alternatively, at step 318, no tables are created and, instead, the database structural changes at 316 are committed to the repository. Next, at 324, it is determined whether any changes are made to the data in the dictionary tables. If yes, the data changes are committed to the repository at 326. However, if no changes were made, synchronization is completed at 328 and process 300 ends.

It can be appreciated that the approaches disclosed herein can be used within a computer system to enable collaborative development of a database application across multiple database management systems, as shown in FIG. 1. In this case, DDCT 118 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on, that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, as will be described herein, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Figure 4:
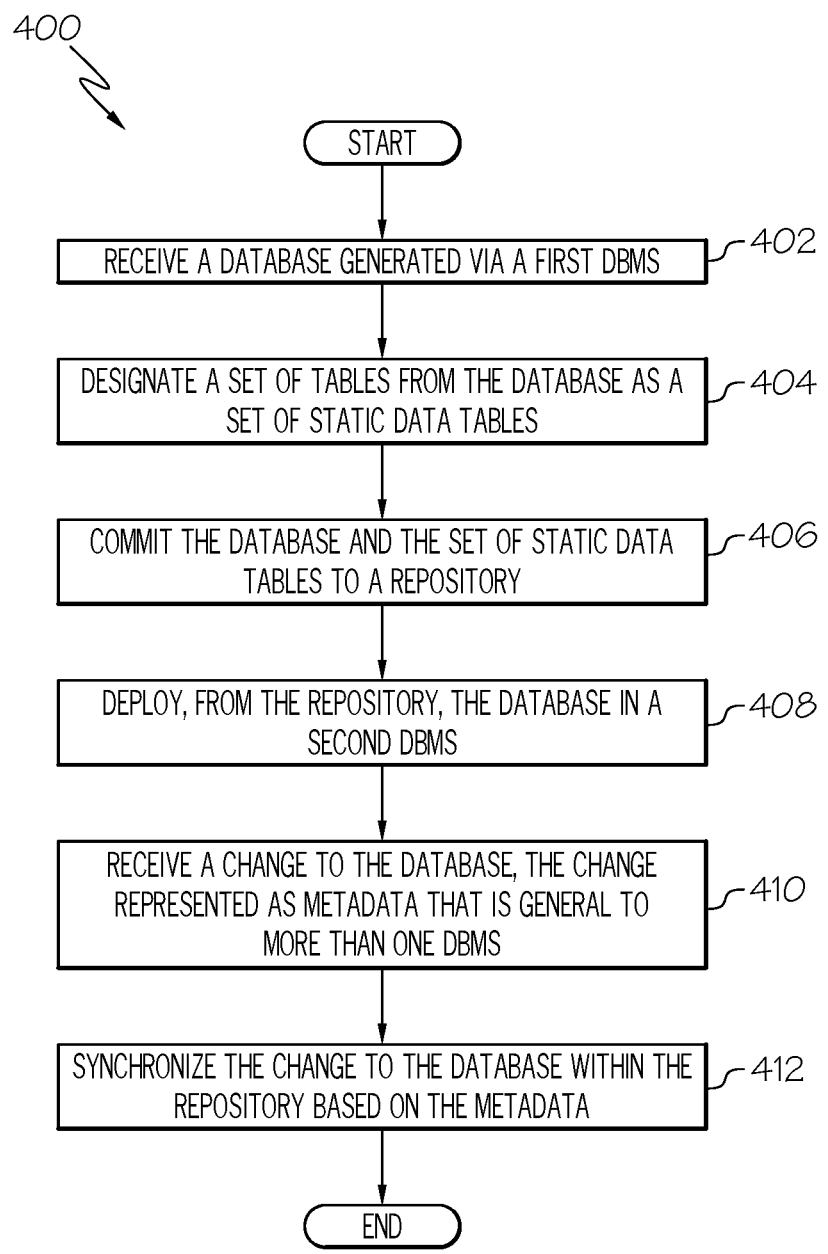
FIG. 4 shows a flow diagram of an approach for enabling collaborative development of a database application across multiple database management systems.

The program modules carry out the methodologies disclosed herein, as illustrated in FIG. 4. Shown is a method 400 for enabling collaborative development of a database application across multiple database management systems, wherein, at 402, a database generated via a first DBMS is received. At 404, a set of tables from the database is designated as a set of static data tables. At 406, the database and the set of static data tables are committed to a repository. At 408, the database is deployed from the repository in a second, different DBMS. At 410, a change to the database is received via the first or second DBMS, the change represented as metadata that is general to more than one DBMS. Finally, at 412, the change to the database is synchronized within the repository based on the metadata.

The process flowcharts of FIGS. 3-4 illustrate the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

For example, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer-readable storage device" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided an approach for enabling collaborative development of a database application across multiple database management systems. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for enabling collaborative development of a database application, the method comprising:
    receiving a database via a first database management system (DBMS);
    designating a set of tables from the database as a set of static data tables;
    committing the database and the set of static data tables to a repository;
    deploying, from the repository, the database in a second DBMS;
    receiving a change to the database; and
    synchronizing the change to the database within the repository, the synchronizing comprising:
        when the change is to a structure of the database,
            generating a set of new tables in response to receiving the change to the structure of the database;
            adding the new tables to the set of static data tables;
            receiving an indication that the set of new tables are static tables; and
            committing the structure change to the repository.

2. The method of claim 1, the synchronizing further comprising: when the change is to data in a table of the set of static data tables of the database, committing the data change to the repository.

3. The method according to claim 2, wherein the change is add table, alter table, delete table, create trigger, alter view, insert data, update data, or delete data.

4. The method according to claim 1, wherein the change is represented as metadata.

5. The method according to claim 1, further comprising reporting the change to the database.

6. The method according to claim 1, wherein the database is generated in a first database language, and the change to the database is generated by a second user in a second database language.

7. The method according to claim 1, wherein the first DBMS has a first DBMS type and the second DBMS has a second DBMS type different than the first DBMS type.

8. A system for enabling collaborative development of a database application across multiple database management systems, the system comprising:
    at least one processing unit;
    memory operably associated with the at least one processing unit; and
    a database development collaboration tool (DDCT) storable in memory and executable by the at least one processing unit, the DDCT comprising:
        a development module configured to:
            receive a database via a first database management system DBMS);
            designate a set of tables from the database as a set of static data tables;
            commit the database and the set of static data tables to a repository;
            deploy, from the repository, the database in a second DBMS;
        a synchronization module configured to:
            receive a change to the database; and
            synchronize the change to the database within the repository, the synchronizing comprising:
                when the change is to a structure of the database,
                    generating a set of new tables in response to receiving the change to the structure of the database;
                    adding the new tables to the set of static data tables;
                    receiving an indication that the set of new tables are static tables; and
                    committing the structure change to the repository.

9. The system according to claim 8, the synchronizing comprising: when the change is to data in a table of the set of static data tables of the database, committing the data change to the repository.

10. The system according to claim 9, wherein the change is add table, alter table, delete table, create trigger, alter view, insert data, update data, or delete data.

11. The system according to claim 8, wherein the change is represented as metadata.

12. The system according to claim 8, the synchronization module further configured to report the change to the database.

13. The system according to claim 8, wherein the database is generated in a first database language, and the change to the database is generated in a second database language.

14. The system according to claim 8, wherein the first DBMS has a first DBMS type and the second DBMS has a second DBMS type different than the first DBMS type.

15. A computer-readable storage device storing computer instructions, which when executed, enables a computer system to provide collaborative development of a database application across multiple database management systems, the computer instructions comprising:
    receiving a database via a first database management system (DBMS);
    designating a set of tables from the database as a set of static data tables;
    committing the database and the set of static data tables to a repository;

deploying, from the repository, the database in a second DBMS;

receiving a change to the database; and synchronizing the change to the database within the repository, the synchronizing comprising:
   when the change is to a structure of the database,
      generating a set of new tables in response to receiving the change to the structure of the database;
      adding the new tables to the set of static data tables;
      receiving an indication that the set of new tables are static tables; and
      committing the structure change to the repository.

16. The computer-readable storage device according to claim 15, the synchronizing comprising: when the change is to data in a table of the set of static data tables of the database, committing the data change to the repository.

17. The computer-readable storage device according to claim 16, wherein the change is add table, alter table, delete table, create trigger, alter view, insert data, update data, or delete data.

18. The computer-readable storage device according to claim 15, wherein the change is represented as metadata.

19. The computer-readable storage device according to claim 15, wherein the database is generated in a first database language, and the change to the database is generated in a second database language.

20. The computer-readable storage device according to claim 15, wherein the first DBMS has a first DBMS type and the second DBMS has a second DBMS type different than the first DBMS type.

* * * * *